United States Patent [19]
Huber et al.

[11] Patent Number: 5,315,912
[45] Date of Patent: May 31, 1994

[54] SUSPENDED HOOP SEAL

[75] Inventors: Michael S. Huber, Milpitas; Jerry K. Endo, Santa Clara, both of Calif.

[73] Assignee: Westinghouse Electric Corp., Pittsburgh, Pa.

[21] Appl. No.: 609,377

[22] Filed: May 11, 1984

[51] Int. Cl.⁵ .............................. F41F 3/073
[52] U.S. Cl. ................... 89/1.816; 89/1.809; 277/212 F
[58] Field of Search ............... 89/1.816, 1.809, 1.810; 277/212 R, 212 C, 212 F, 212 FB, 152, 205, 206 R, 214

[56] References Cited

U.S. PATENT DOCUMENTS

| | | | |
|---|---|---|---|
| 3,124,040 | 3/1964 | Fiedler | 89/1.816 |
| 3,289,533 | 12/1966 | Brown | 89/1.810 |
| 3,857,321 | 12/1974 | Cohen | 89/1.816 X |
| 4,033,593 | 7/1977 | Molnar et al. | 277/214 X |
| 4,396,201 | 8/1983 | Rudd et al. | 277/212 F |
| 4,399,999 | 8/1983 | Wold | 89/1.816 X |
| 4,406,211 | 9/1983 | Andersen | 89/1.816 |
| 4,433,848 | 2/1984 | Williams | 89/1.816 X |
| 4,457,518 | 7/1984 | Endo et al. | 277/212 C X |

Primary Examiner—David H. Brown
Attorney, Agent, or Firm—D. Schron

[57] ABSTRACT

A seal for a large annular opening between a launch tube and a missile comprising a suspended hoop composed of a pair of cylindrical rings spaced apart by axially disposed chevron-shaped struts, the inner cylindrical ring having a frustoconically shaped lip extending from its lower margin and a foot cylindrical ring is disposed below the suspended hoop with a frustoconically or half-toroid shaped membrane having a fibrous cloth embedded therein extending between and into the inner cylindrical ring and the lip portion to provide a stabilizing seal.

9 Claims, 2 Drawing Sheets

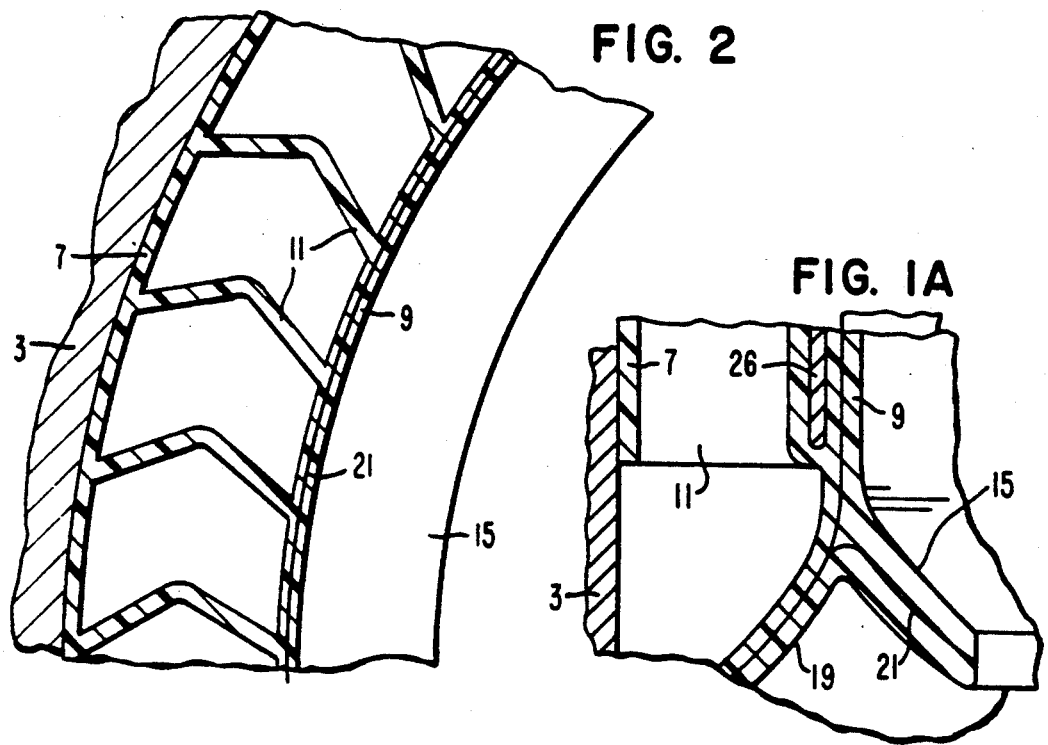
FIG. 2
FIG. 1A
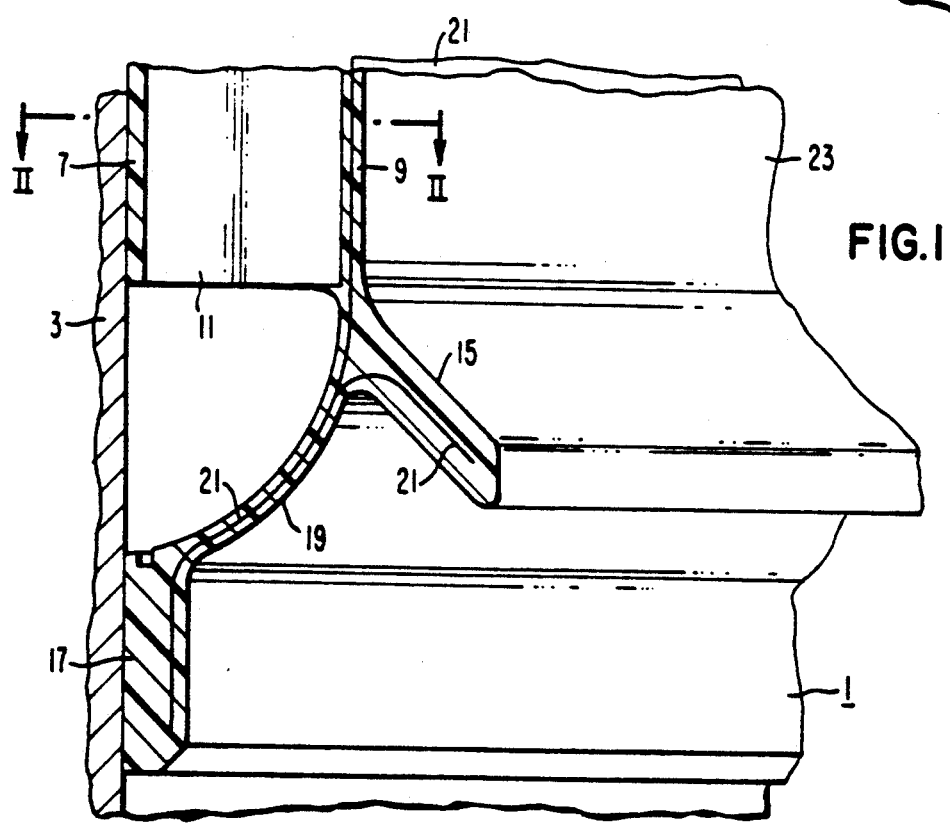
FIG. 1

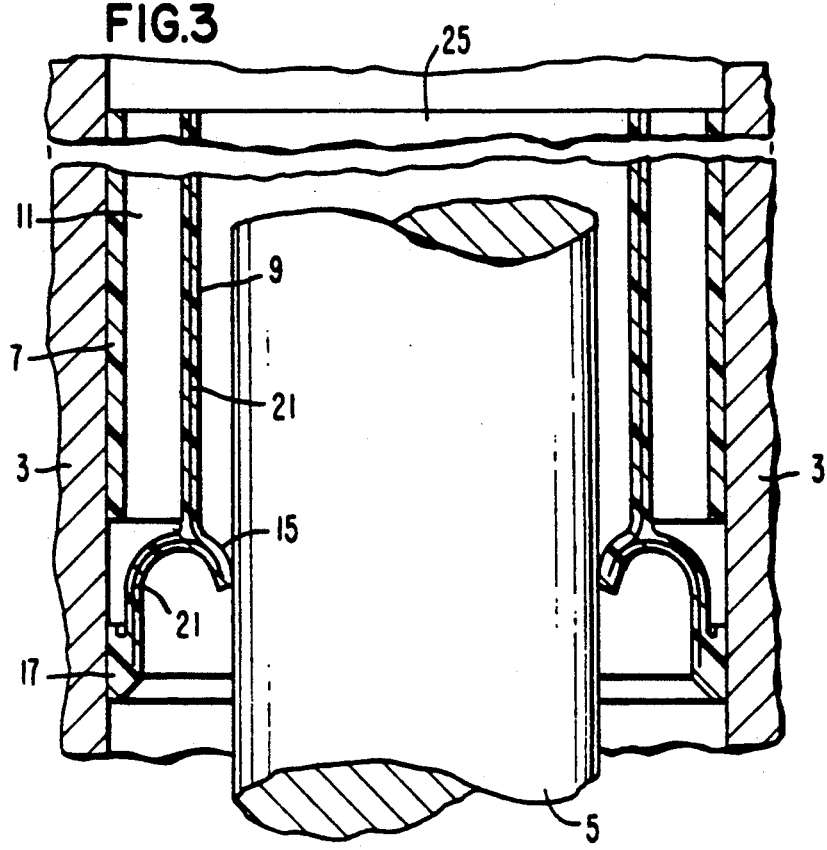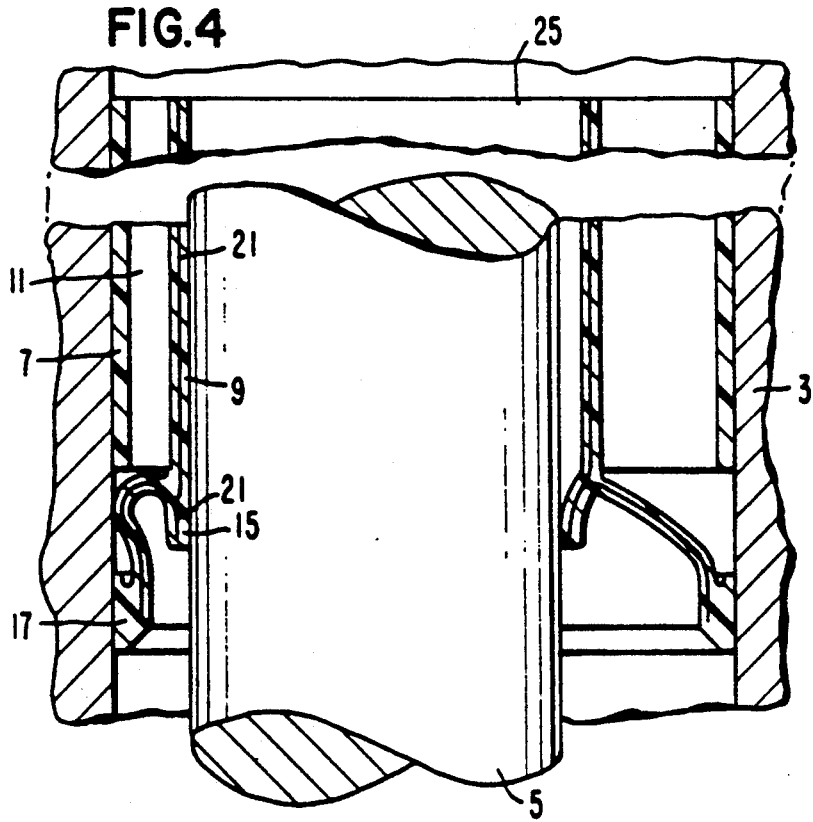

SUSPENDED HOOP SEAL

GOVERNMENT CONTRACT

The United States Government has rights in this invention pursuant to Contract No. N00030-81-C-0105 between Westinghouse Electric Corporation and the Department of Defense.

BACKGROUND OF THE INVENTION

This invention relates to a seal and more particularly to a seal for a large annular opening.

Seals such as this are utilized in missile launch tubes to control the distribution of eject gas pressure on pressure sensitive areas of the missile surface, as the seal prevents eject gases from leaking up the annulus formed by the launch tube and missile. Since the annulus is spacious in order to provide room for lateral missile motions during shock and launch, large seals which can allow these missile motions while controlling the eject gas are required.

Despite performance which is not entirely satisfactory and predictable, lip-type seals such as shown in U.S. Pat. No. 4,033,593, have been in general use for this application. The reasons for the usage of lip seals include ease of manufacture, installation, and they allow lateral missile excursion while sealing against excessive launch pressure leakage. While such seals have been adequate to withstand the normal launch pressures, their disadvantages include: (1) forces induced in the seal tend to concentrate at specific locations on the attachment surface, raising the possibility of attachment system failure; (2) adverse lateral force differentials are induced in the missile as it becomes offset in the launch tube; and (3) the lip seal will tend to hump up under pressure and may invert if pressure differentials become too high.

Generally speaking, design criteria for large seals of this type include: (1) minimization of destabilizing lateral impulses; (2) generation of stabilizing lateral forces; (3) high reliability; (4) high pressure capability; and (5) minimal performance variability. The unique configuration of the suspended hoop seal provides the potential means to improve seal performance in these areas.

SUMMARY OF THE INVENTION

A seal between a high and low pressure portion of a large annular opening between two cylindrical surfaces, when made in accordance with this invention, comprises a first cylindrical ring attached to one of the cylindrical surfaces, a second cylindrical ring spaced annularly with respect to the first cylindrical ring and a plurality of struts extending between and attached to the first and second cylindrical surfaces. A generally frustoconically shaped lip extends from the lower margin of the second cylindrical ring and extends at an angle toward the high pressure side of the seal. A third cylindrical ring is attached to the first cylindrical surface and spaced from the first cylindrical ring on the high pressure side thereof and a membrane extends from the third cylindrical ring to the lip forming a seal. The membrane, in conjunction with the hoop strength provided by the second cylindrical ring, prevents lip inversion when the seal is subjected to high differential pressures and creates good centering characteristics irrespective of the differential pressure to which the seal is subjected.

BRIEF DESCRIPTION OF THE DRAWINGS

The object and advantages of this invention will become more apparent from reading the following detailed description in connection with the accompanying drawings, in which:

FIG. 1 and 1A are a partial sectional views of a seal in its free state;

FIG. 2 is a partial sectional view taken on line II—II of FIG. 1;

FIG. 3 is a sectional view of the seal showing a missile concentrically disposed in a launch tube; and FIG. 4 is a sectional view of a seal showing the missile off center in the launch tube forming a wide gap on one side of the missile and a narrow gap on the opposite side thereof.

DESCRIPTION OF THE PREFERRED EMBODIMENT

Referring now to the drawings in detail there is shown an elastomer seal 1, which seals a large annular opening between two cylindrical surfaces, a launch tube 3 and a missile 5.

As shown in FIGS. 1 and 2 the seal 1 comprises a first cylindrical ring 7 attached to one of the cylindrical surfaces, the launch tube 3, by an adhesive; a second cylindrical ring 9 spaced annularly with respect to the first cylindrical ring 7; and a plurality of axially oriented, chevron-shaped struts 11 extending between the cylindrical rings 7 and 9. The cylindrical rings and struts are made integral and the struts 11 generally form an acute angle. Extending from the lower edge or lower margin of the second cylindrical ring 9 and oriented downwardly and radially inwardly toward the high pressure portion of the annulus is a lip portion 15 which is generally frustoconically shaped.

A third cylindrical ring 17 is attached to the one cylindrical surface or the launch tube 3 by an adhesive and a membrane 19 is disposed between the third cylindrical ring 17 and the lip 15. The membrane 19 has a fibrous cloth 21 embedded therein and at least the fibrous cloth extends into the second and third cylindrical rings 9 and 17 and may extend into the lower portion of the lip 15 as shown. The space between the first and third cylindrical rings 7 and 17, respectively, is greater than the length of the lip 15 so that if the missile 5 is eccentrically disposed in the launch tube 3 as shown in FIG. 4, the lip 15 will fit between the first and third cylindrical rings 7 and 17. The radially inner surfaces 25 of the second cylindrical ring 9 and lip 15 are preferably coated with a slippery material such as Teflon ® or a tetrafluoroethylene. The second ring may have a rigid hoop 26 made of steel or a graphite epoxy to increase its hoop strength, as set forth in FIG. 1A.

FIG. 3 shows the missile concentrically disposed in the launch tube and it can be noted that the lip 15 is distorted by the missile 5 and there is clearance between the missile 5 and the second cylindrical ring 9 to allow for tolerance buildups. When the missile 5 becomes eccentrically disposed in the launch tube 3 as shown in FIG. 4, the second cylindrical ring 9 and struts 11 tend to apply a centering force as the struts 11 undergo compressive, shear and tensile forces providing opposite reaction on the second cylindrical ring 9 to produce a stabilizing force on the missile 5.

In addition to the centering force produced by the struts and the second cylindrical ring, (which occurs with or without pressurization of the seal), the pressure membrane geometry created by the eccentrically disposed missile acts to produce a higher tensile force in the pressure membrane on the wide gap side of the seal. This tensile force reacts on the missile due to the hoop strength of the second cylindrical ring and creates a stabilizing force on the missile. The magnitude of this force can be tailored by changing the pressure membrane length and/or tensile properties.

The seal hereinbefore described advantageously provides a tunable seal with spaced-apart sealing line (the circumferential line where the seal is formed) and uncorking line (the circumferential line where the trailing end of the missile leaves the seal) which results in a general configuration that allows the tuning of seal performance characteristics over a wide range with minor and easily implemented geometry changes. This tunability is derived principally from the separation between the sealing line and the uncorking line. The reinforced hoop in the second cylindrical ring provides the needed hoop strength to maintain seal performance and create the separate sealing and uncorking lines and yet provide sufficient flexibility to permit enough seal deformation to allow relatively easy installation of the missile in the launch tube.

What is claimed is:

1. A seal between a high and low pressure portion of a large annular opening between two cylindrical surfaces comprising:
    a first cylindrical ring attached to one of said cylindrical surfaces;
    a second cylindrical ring spaced annularly with respect to said first cylindrical ring;
    a plurality of struts extending between and attached to said first and second cylindrical rings;
    a generally frustoconically shaped lip extending radially toward the high pressure side of the seal and from the second cylindrical ring;
    a third cylindrical ring attached to said one cylindrical surface and spaced from the first cylindrical ring on the high pressure side thereof;
    a membrane extending from said third cylindrical ring to said lip forming a seal which in conjunction with the hoop strength provided by the second cylindrical ring, prevents lip inversion when the seal is subjected to high pressure differentials and creates good centering characteristics with high and low pressure differentials across the seal.

2. A seal as set forth in claim 1, wherein the spaced between the first and third cylindrical rings is greater than the length of the lip.

3. A seal as set forth in claim 1, wherein the membrane is generally frustoconically or half-toroid shaped.

4. A seal as set forth in claim 1, wherein the membrane has a fibrous cloth embedded therein to provide tensile strength thereto.

5. A seal as set forth in claim 4, wherein the fibrous cloth extends into the second and third cylindrical rings.

6. A seal as set forth in claim 5, wherein the fibrous cloth also extends into the lip.

7. A seal as set forth in claim 4, wherein the fibrous cloth is oriented mainly circumferentially in the second cylindrical ring, thus increasing the hoop strength and hoop modulus of the second ring.

8. A seal as set forth in claim 7, wherein a rigid hoop is disposed in the second cylindrical ring to provide the necessary hoop strength therein.

9. A seal as set forth in claim 7, wherein the fibrous cloth reinforces the membrane and forms an integral part of the second cylindrical ring.

* * * * *